US010129325B2

(12) United States Patent
Kelani et al.

(10) Patent No.: US 10,129,325 B2
(45) Date of Patent: Nov. 13, 2018

(54) SYSTEMS AND METHODS FOR CONTROLLING A DEVICE VIA GESTURES RECEIVED BY A REMOTE DEVICE

(71) Applicant: ShowKit, Inc., Los Angeles, CA (US)

(72) Inventors: Anthony Kelani, Los Angeles, CA (US); David Gonen, West Hollywood, CA (US); James Hurley, West Hollywood, CA (US); Matt Van Veenendaal, Los Angeles, CA (US)

(73) Assignee: Showkit, Inc., Los Angeles, CA (US)

( * ) Notice: Subject to any disclaimer, the term of this patent is extended or adjusted under 35 U.S.C. 154(b) by 392 days.

(21) Appl. No.: 14/639,971

(22) Filed: Mar. 5, 2015

(65) Prior Publication Data

US 2015/0256593 A1    Sep. 10, 2015

Related U.S. Application Data

(60) Provisional application No. 61/948,505, filed on Mar. 5, 2014.

(51) Int. Cl.
*G06F 3/048* (2013.01)
*H04L 29/08* (2006.01)
*G06F 3/0488* (2013.01)
*H04W 4/21* (2018.01)

(52) U.S. Cl.
CPC ........ *H04L 67/025* (2013.01); *G06F 3/04883* (2013.01); *H04W 4/21* (2018.02); *G06F 2203/0383* (2013.01)

(58) Field of Classification Search
CPC .................. G06F 3/017; G06F 3/048–3/04886
See application file for complete search history.

(56) References Cited

U.S. PATENT DOCUMENTS

| 8,738,814 B1* | 5/2014 | Cronin ................ G06F 3/04883 710/15 |
| 2012/0092277 A1* | 4/2012 | Momchilov ............ G06F 3/038 345/173 |
| 2013/0194374 A1* | 8/2013 | Kieft ...................... H04L 67/38 348/14.07 |
| 2016/0249106 A1* | 8/2016 | Lachwani ...... H04N 21/234309 |

* cited by examiner

*Primary Examiner* — Claudia Dragoescu
(74) *Attorney, Agent, or Firm* — Perkins Coie LLP

(57) ABSTRACT

A method and system for sharing a user interface of a first device with a second device and enabling a user of the second device to interact with the user interface via gestures received by the second device. The first device (e.g., a smartphone) can host an application and generate a graphical user interface, which it transmits to the second device (e.g., a tablet computer) for display by the second device. The second device can receive input from a user, such as a touch input via a touchscreen of the second device, and transmit a representation of the input to the first device for providing input to the application hosted by the first device.

17 Claims, 11 Drawing Sheets

SYSTEMS AND METHODS FOR CONTROLLING A DEVICE VIA GESTURES RECEIVED BY A REMOTE DEVICE

CROSS-REFERENCE TO RELATED APPLICATION

This application claims the benefit of and priority to U.S. Provisional Patent Application No. 61/948,505, filed Mar. 5, 2014, which is incorporated herein by reference in its entirety.

BACKGROUND

Remote desktop systems allow a personal computer's desktop environment to be run remotely on one system, while being displayed on a separate client device. Some systems additionally provide for remote control of the personal computer by the separate client device. Many software applications similarly provide for remote control of an application environment hosted by a remote computer. Using these systems, a remote user can interact with a computer system as if the user were physically in front of it.

Conventional systems that provide for remote control of a device work well on laptop and personal computer systems, but they do not work between most mobile devices. Indeed, to provide remote services, these systems typically transmit display data from a host computer to a client computer, and mouse clicks and keyboard input from the client computer to the host computer. But mobile devices typically provide only a touch screen interface. Accordingly, conventional remote desktop systems cannot be deployed in many mobile devices.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
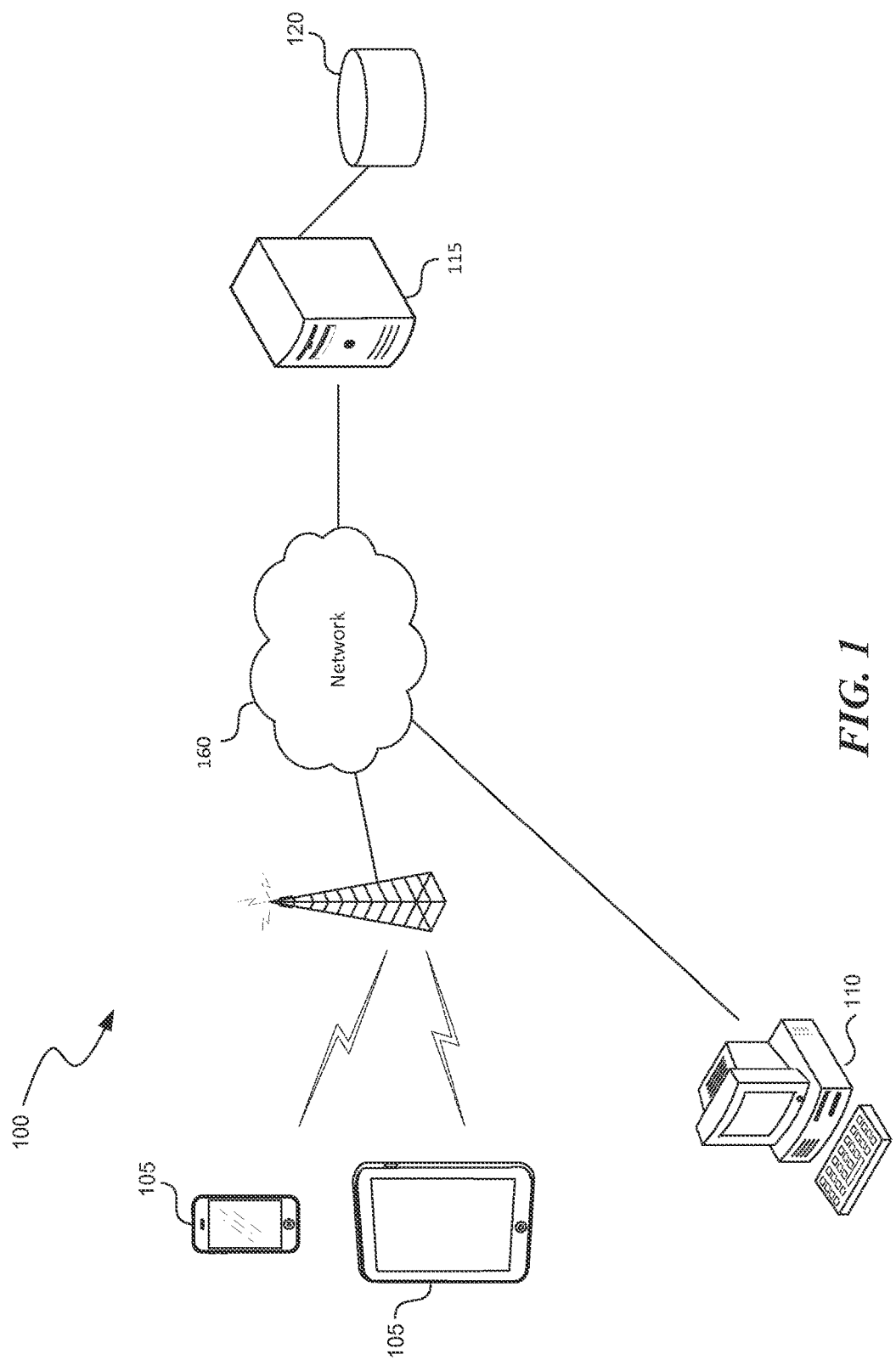
FIG. 1 is a diagram of a suitable environment in which a system for providing for control of a first device via input received by a remote device operates.

A method and system are described for sharing, with a remote device, a graphical user interface that is generated and hosted by a host device, and providing control of the host device via input received by the remote device. Inputs received by the remote device may be in the form of gestures, i.e., touch inputs to a touch-sensitive device. The system processes gestures received by the remote device to account for any differences in how the graphical user interface is displayed on the host and remote device, for example due to differences in screen size, device orientation, and whether the graphical user interface takes up the entirety of the screen. The system may be used to facilitate, for example, video conferencing and screen sharing between two devices. In some embodiments, the system provides for a peer-to-peer (p2p) transfer of user interface and gesture control data between the host and remote devices. In some embodiments, the system provides for hardware-accelerated video encoding and decoding of the transmitted data to enable streaming without expensive hardware costs.

The system can commence screen sharing and gesture control when a first device sends a video stream of a graphical user interface to a second device. The graphical user interface may correspond to an application or operating system (OS) running on the first device. The second device receives the video stream of the first device's user interface and displays the graphical user interface to a user of the second device. The second device receives an input gesture from the user of the second device, responding to the video stream of the first device's user interface as if it were the user interface of an application or OS running locally on the second device. The gesture is processed and transmitted to the first device, and the first device implements the gesture as if it was received locally.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

The following discussion includes examples of a screen sharing and remote gesture control system used within an application for tracking financial accounting events, such as a banking application. While depicted in a financial application, however, it will be appreciated that the system may be implemented within any application or environment for which screen sharing and remote gesture control is desired.

Suitable Environments

FIG. 1 and the following discussion provide a brief, general description of a suitable computing environment 100 in which a screen sharing and remote gesture control system, as described herein, can be implemented. Although not required, aspects and implementations of the invention will be described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network 160, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1, a system operates in or among mobile devices 105, personal computers 110, and one or more server computers 115. The mobile devices 105 and personal computers 110 communicate through one or more wired or wireless networks 160 with each other and with the server 115. A data storage area 120 contains data utilized by the system, and, in some implementations, software necessary to perform functions of the system.

The mobile devices 105 may communicate with each other and/or with the personal computer 110 via a peer-to-peer (p2p) connection. These devices may also communicate with each other through the server 115, such as through an application hosted at the server computer.

Suitable Devices

Figure 2:
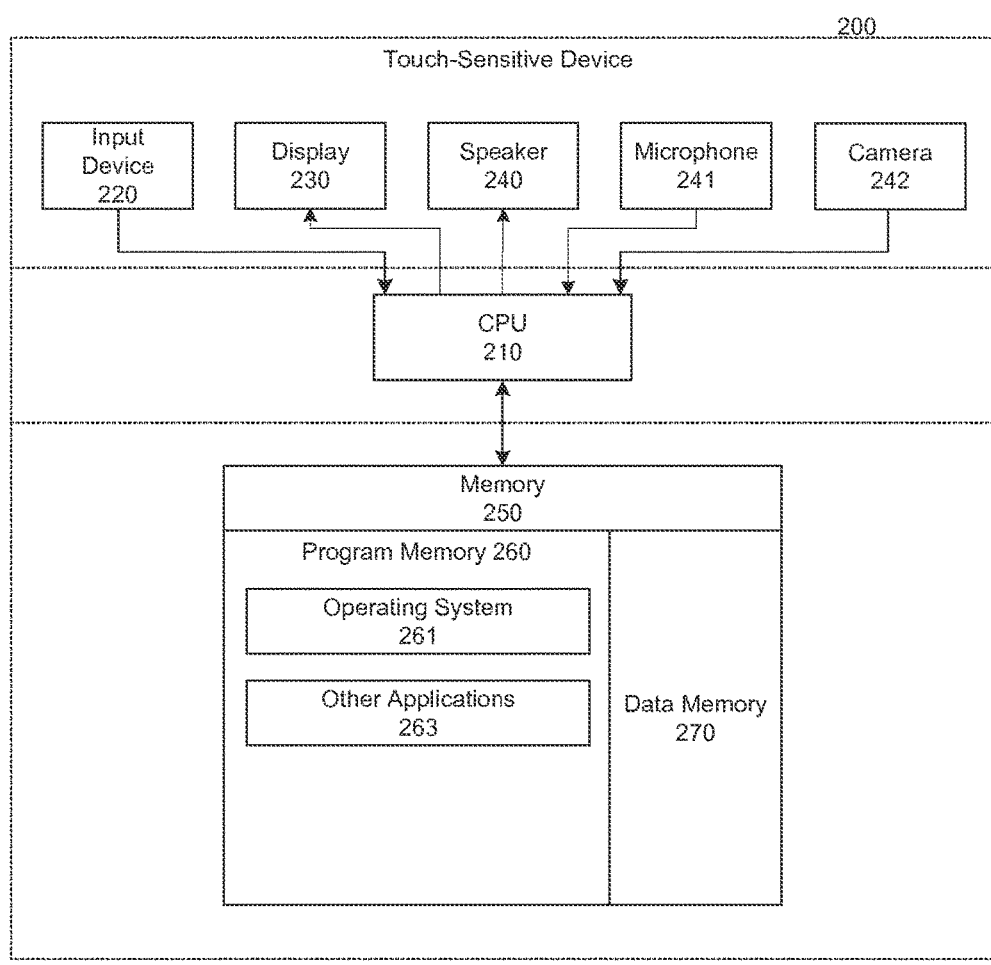
FIG. 2 is a block diagram of a host device that may be controlled by gestures received by a remote device, or a remote device that may receive gestures to control a host device.

FIG. 2 is a block diagram illustrating a computing device 200, including hardware components, for implementing the disclosed technology. For example, the device can be implemented as mobile device 105. The device 200 includes one or more input devices 220 that provide input to the CPU (processor) 210, notifying it of actions performed by a user, such as a tap or gesture. The actions are typically mediated by a hardware controller that interprets the signals received from the input device and communicates the information to the CPU 210 using a known communication protocol. Input devices 220 include, for example, a capacitive touchscreen, a resistive touchscreen, a surface wave touchscreen, a surface capacitance touchscreen, a projected touchscreen, a mutual capacitance touchscreen, a self-capacitance sensor, an infrared touchscreen, an infrared acrylic projection touchscreen, an optical imaging touchscreen, a touchpad that uses capacitive sensing or conductance sensing, or the like.

The CPU may be a single processing unit or multiple processing units in a device or distributed across multiple devices. Similarly, the CPU 210 communicates with a hardware controller for a display 230 on which text and graphics are displayed. One example of a display 230 is a display of the touchscreen that provides graphical and textual visual feedback to a user. In some implementations, the display includes the input device as part of the display, such as when the input device is a touchscreen. In some implementations, the display is separate from the input device. For example, a touchpad (or trackpad) may be used as the input device 220, and a separate or standalone display device that is distinct from the input device 220 may be used as the display 230. Examples of standalone display devices are: an LCD display screen, an LED display screen, a projected display (such as a heads-up display device), and so on. Optionally, a speaker 240 is also coupled to the processor so that any appropriate auditory signals can be passed on to the user. In some implementations, device 200 includes a microphone 241 and camera 242 that are also coupled to the processor so that spoken and video input can be received from the user.

The processor 210 has access to a memory 250, which may include a combination of temporary and/or permanent storage, and both read-only and writable memory (random access memory or RAM), read-only memory (ROM), writable non-volatile memory, such as flash memory, hard drives, floppy disks, and so forth. The memory 250 includes program memory 260 that contains all programs and software, such as an operating system 261, and any other application programs 263. The memory 250 also includes data memory 270 that includes any configuration data, settings, user options and preferences that may be needed by the program memory 260, or any element of the device 200. In some implementations, the memory also includes dynamic template databases to which user/application runtime can add customized templates. The runtime-created dynamic databases can be stored in persistent storage and loaded at a later time.

As mentioned above, the device 200 also includes a communication device capable of communicating wirelessly with a base station or access point using a wireless mobile telephone standard, such as the Global System for Mobile Communications (GSM), Long Term Evolution (LTE), IEEE 802.11, or another wireless standard. The communication device may also communicate with another device or a server through a network using, for example, TCP/IP protocols. For example, device 200 may utilize the communication device to offload some processing operations to the server 115.

Device 200 may include a variety of computer-readable media, e.g., a magnetic storage device, flash drive, RAM, ROM, tape drive, disk, CD, or DVD. Computer-readable media can be any available storage media and include both volatile and nonvolatile media and removable and non-removable media.

As mentioned above, the disclosed technology is operational with numerous other general purpose or special purpose computing system environments or configurations. Examples of well-known computing systems, environments, and/or configurations that may be suitable for use with the technology include, but are not limited to, personal computers, handheld or laptop devices, cellular telephones, tablet devices, multiprocessor systems, microprocessor-based systems, programmable consumer electronics, network PCs, minicomputers, mainframe computers, gaming consoles, televisions, e-readers, kiosk machines, wearable computers, speech generating devices, other devices for the disabled, and distributed computing environments that include any of the above systems or devices, and the like.

It is to be understood that the logic illustrated in each of the following block diagrams and flow diagrams may be altered in a variety of ways. For example, the order of the logic may be rearranged, sub-steps may be performed in parallel, illustrated logic may be omitted, other logic may be included, etc.

Suitable Systems

Figure 3A:
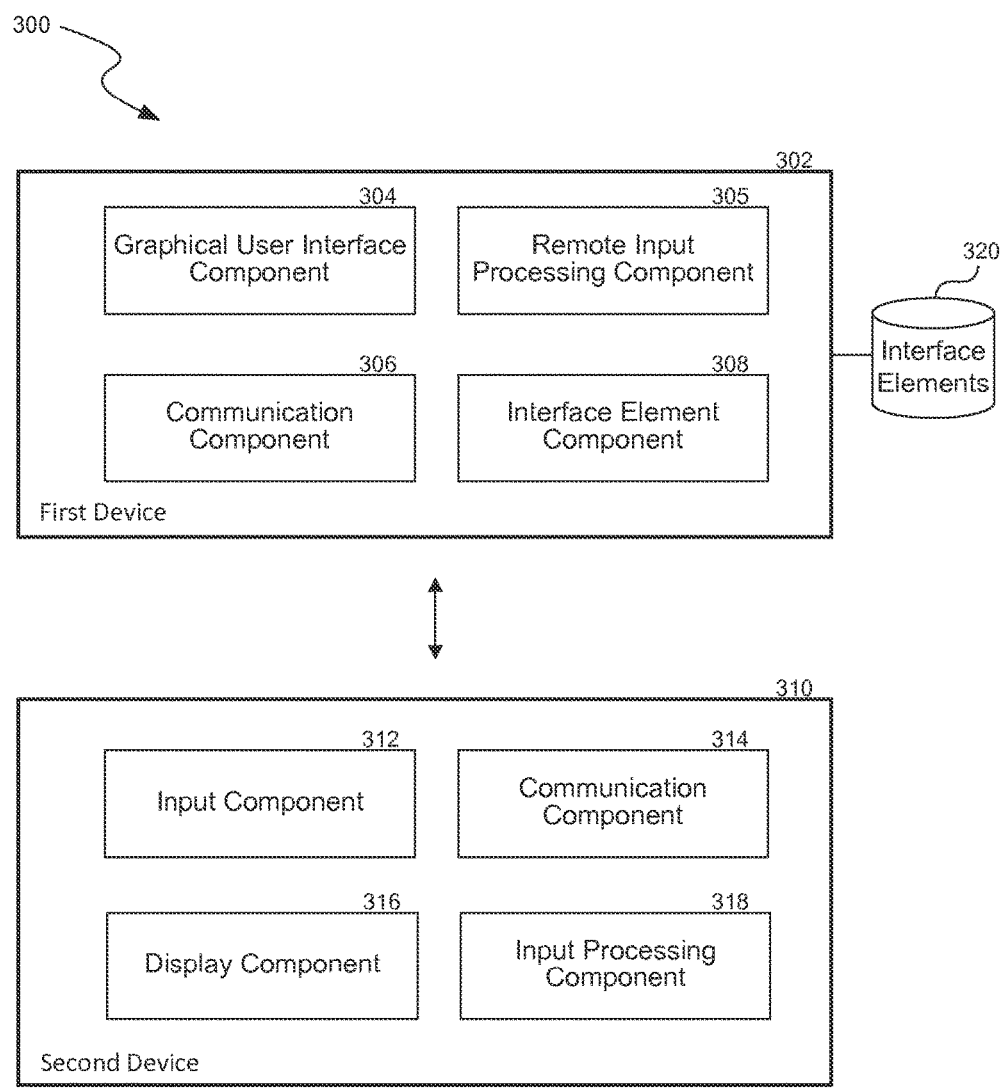
FIG. 3A is a block diagram of a system for providing for control of a first device via input received by a remote device.

FIG. 3A is a block diagram of a system 300 for transmitting a graphical user interface generated by a first device to a second device, and for receiving input at the second device for controlling the first device. The system includes a first device component 302 and a second device component 310. The first and second device components may be implemented in first and second touchscreen devices, and may be integrated into other applications running on the first and second devices or may be a standalone application on the first and second device. For example, the first device component may be integrated into a mobile banking application running on the first device, while the second device component may be integrated into customer support software used by customer support representatives of a bank. The first device component 302 includes a graphical user interface component 304, a remote input processing component 305, a communication component 306, and an interface element component 308. The first device component 302 reads data from and stores data in interface elements data storage 320. The second device component 310 includes an input component 312, a communication component 314, a display component 316, and an input processing component 318.

The graphical user interface component 304 captures graphical user interface data for transmission to the second device component. In some implementations, the graphical user interface component generates a live stream of the graphical user interface generated by the device hosting the first device component. For example, the graphical user interface component may encode display data of the first device, such as from video memory of the first device, into a video format, such as H.264/MPEG-4. In some implementations, the graphical user interface component captures a graphical user interface at a first time for transmission to the second device component 310 and captures the graphical user interface at subsequent times after the graphical user interface has been refreshed. The communication component 306 is configured to transmit captured graphical user interface data to the second device component 310 as a video stream and to receive input data from the second device component.

The remote input processing component 305 input data received from the second device component 310. In some implementations, the remote input processing component processes raw input data. However, the remote input processing component may also process input data that has been pre-processed by the second device component. For example, the second device component may normalize input data and transmit the normalized input data to the first device component 305, and the remote input processing component may convert the normalized input data to a proper format for providing input to the first device. For example, the remote input processing component 305 can convert gesture data received from the second device component to a format of the operating system of the first device. Based on an analysis of the user interface on the first device, discussed below, the remote input processing component identifies interface elements that are implicated by the received input. For example, the remote input processing component 305 may compare coordinates of a received touch to areas of the graphical user interface encompassed by analyzed interface elements. The remote input processing component notifies the first device of implicated interface elements, such that the first device executes processes or functions associated with the implicated interface elements as a result of the received user input.

The interface element component 308 analyzes graphical user interface data and identifies interface elements in the graphical user interface. In some implementations, the interface element component 308 parses an interface hierarchy of the graphical user interface to identify and catalog interface elements. In some implementations, designated interface elements may be omitted from the catalog of interface elements. In some implementations, designated interface elements may be cataloged but with an indication that the interface elements are not to be implicated by received user input. The interface element component stores data related to interface elements in the interface element data storage area 320.

The input component 312 of the second device component 310 receives user input from a user of the second device. User input includes a gesture, such as a touch gesture received via a touchscreen. The communication component 314 of the second device component 310 receives graphical user interface data from the first device component 302 and transmits input data to the first device component. The display component 316 displays the graphical user interface, such as by rendering a received H.264/MPEG-4 video stream. For example, the display component may display the graphical user interface via a touchscreen. In some implementations, the display component resizes the graphical user interface to fit the second device display. The graphical user interface may be resized to fill the entirety of or less than the full size of the display of the second device display.

The input processing component 318 processes input received from a user via the input component 312. In some implementations, the input processing component 318 is configured to normalize received input based on the aspect ratio of the graphical user interface and/or the first device display. In some implementations, the input processing component 318 does not process input data received by the input component, and instead transmits raw input data and associated metadata to the first device component 302.

Figure 3B:
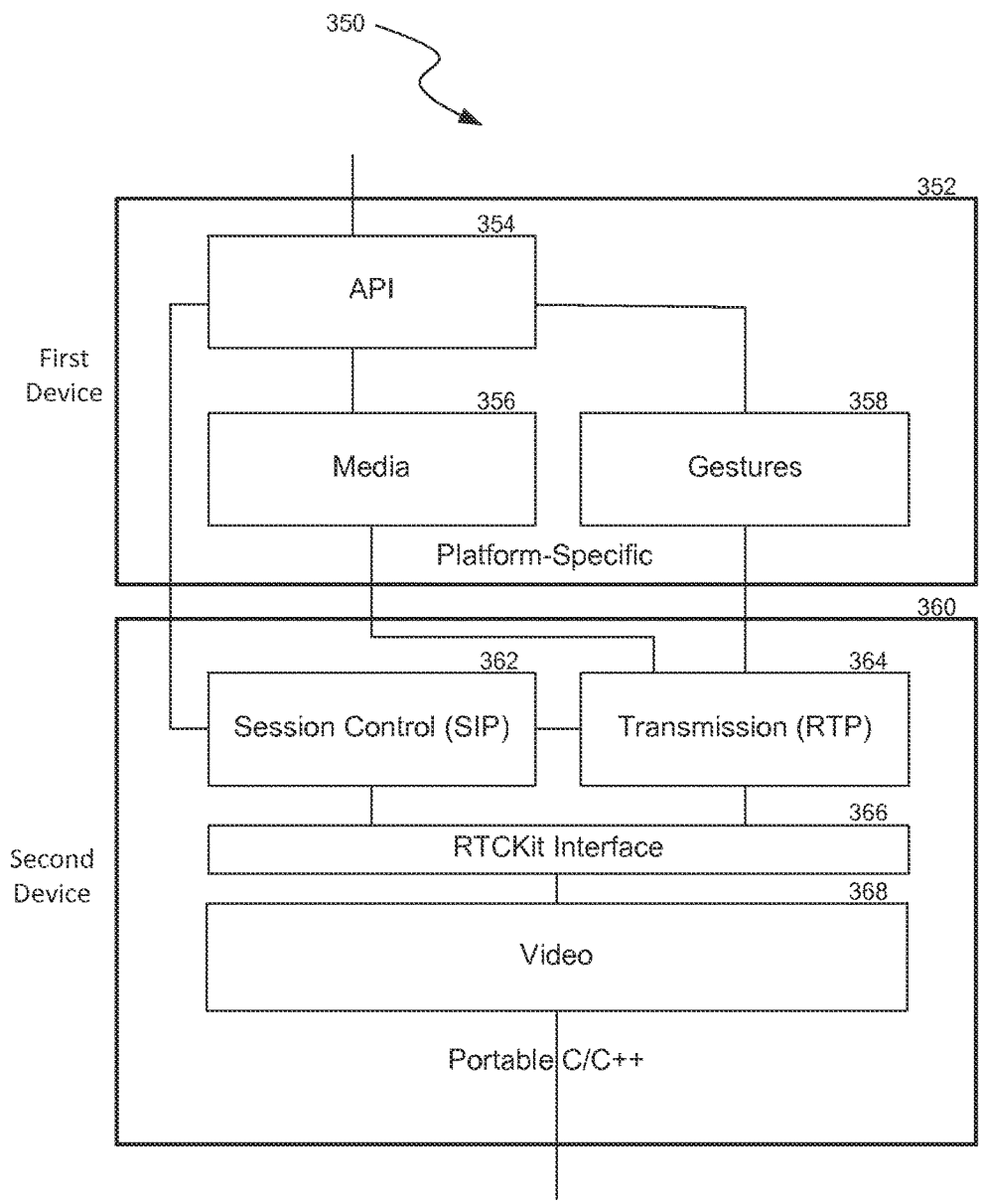
FIG. 3B is a block diagram of a system according to a particular implementation for providing for control of a first device via input received by a remote device.

FIG. 3B is a block diagram of a system 350 for providing screen sharing and remote gesture control of a graphical user interface according to a particular implementation. The system includes a first mobile device component 352 associated with a first mobile device and a second mobile device component 360 associated with a second mobile device. In some implementations, the system is implemented in a software development kit (SDK), which includes client applications that operate on each of the first mobile device and the second mobile device. For example, the system 350 represents a perspective view of architecture of the software development kit. The first device component 352 includes an API module 354, a media module 356, and a gesture support module 358, and the second device component 360 includes a session control module (SIP) 362, a transmission module (RTP) 364, an RTCKit interface module 366, and a video component (Doubango) 368. Doubango is an open source project for various technologies including 3GPP, TISPAN, Packet Cabel, WiMax, GSMA, RCS-e, IETF, audio/video coding, cloud computing, VoIP, and VNC stacks. The medial layer is discussed in more detail below.

Suitable Processes

Figure 4:
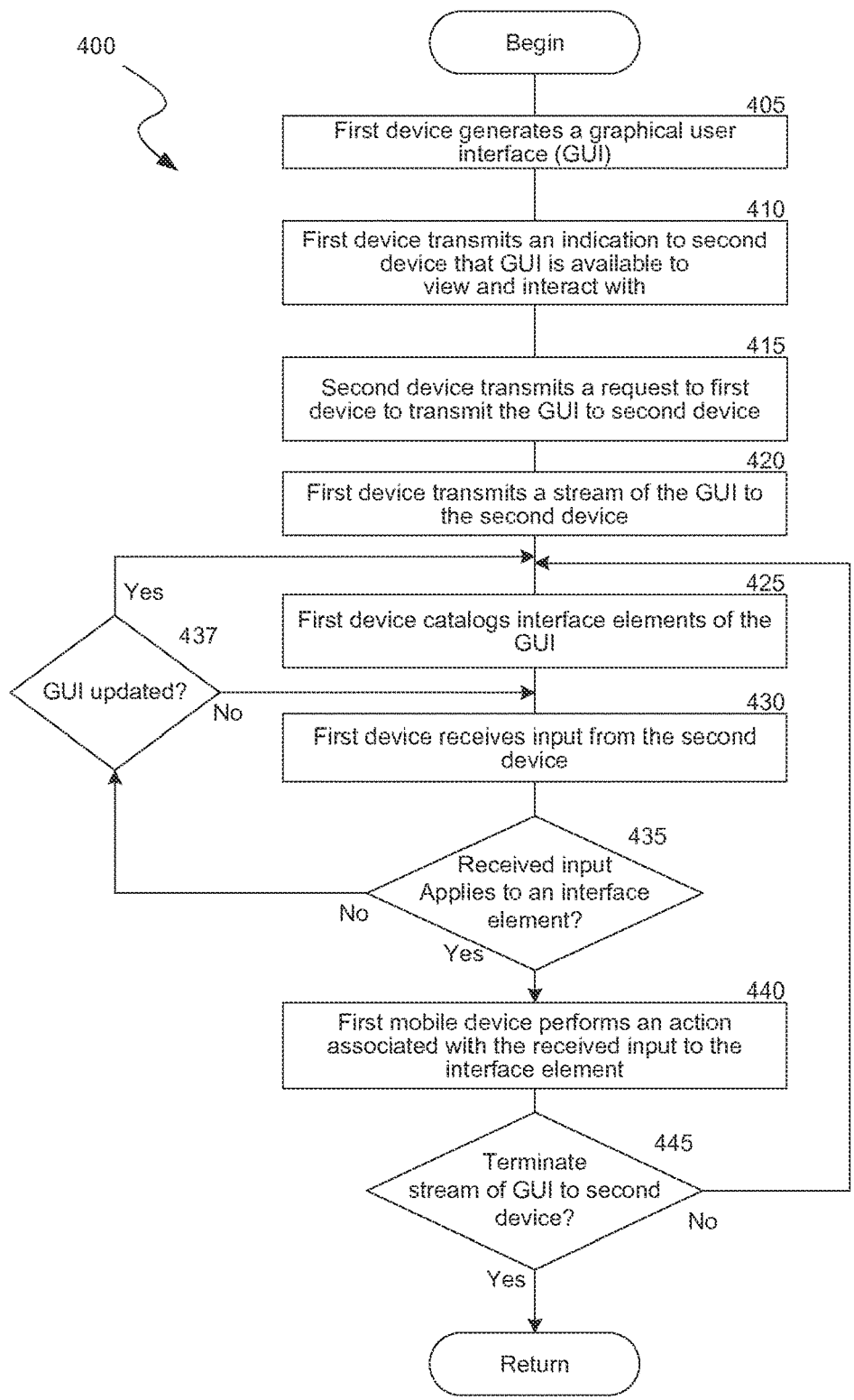
FIG. 4 is a flow diagram depicting a method performed by a system for displaying a graphical user interface generated by a host device on a remote device and controlling a first device via input received by a remote device.
Figure 9:
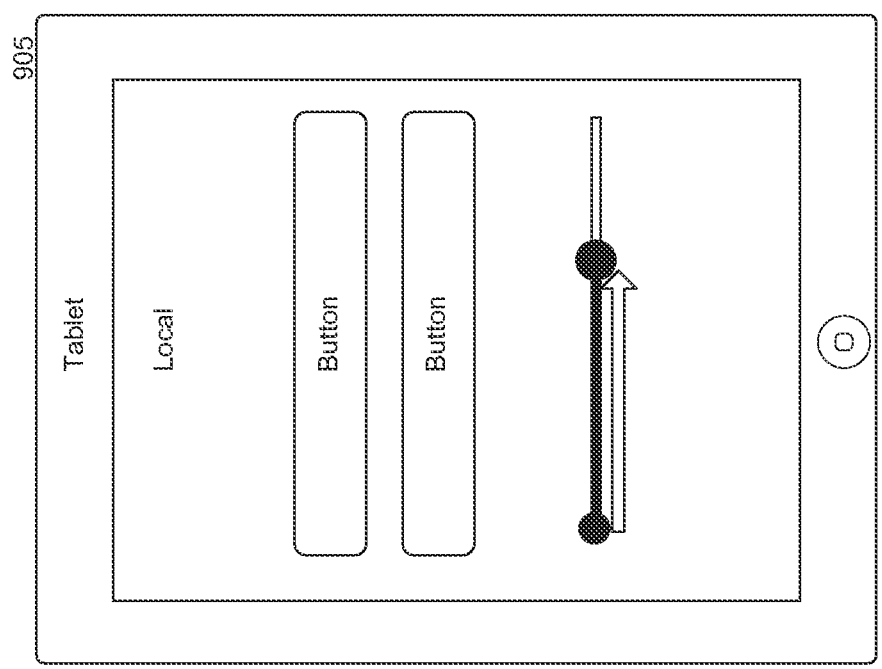
FIG. 9 shows a diagram of a remote device viewing a graphical user interface of a host device and receiving gesture input to control the host device.
Figure 9:
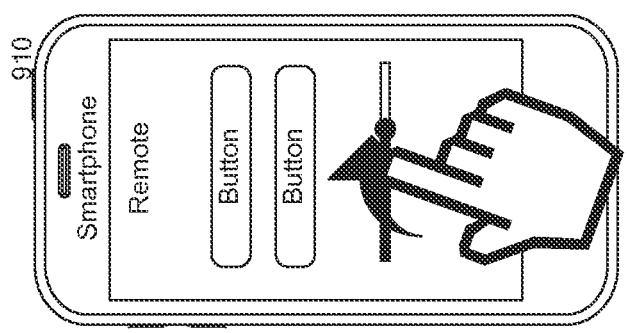

FIG. 4 is a flow diagram representing a process 400 performed by the system 300 for sharing a user interface of a first device with a second device and enabling a user of the second device to interact with the first device user interface via gestures received by the second device. For example, the first device (e.g., a smartphone) can host an application and generate a graphical user interface, which it transmits to the second device (e.g., a tablet computer) for display by the second device. The second device can receive input from a user, such as a touch input via a touchscreen of the second device and transmit an indication of the input to the first device for providing input to the application hosted by the first device. FIG. 9 shows a graphical representation of a first device 905 (a tablet) being controlled by input received at a second device 910 (a phone).

The process begins at a block 405 when the first device generates a graphical user interface. The graphical user interface may be part of a user interface for an operating system, an application operated with the operating system, or the like. At a block 410, the first device transmits an indication to the second device that a graphical user interface is available to view and interact with. The first device may transmit the indication to the second device at the request of a user of the first device. At a block 415, the second device transmits a request to the first device to transmit the graphical user interface to the second device. In some implementations, a user of the second device requests to view and interact with the graphical user interface of the first device prior to the first device providing any indication of its availability. In some implementations, the first device and the second device establish a p2p connection.

At a block 420, the first device transmits the graphical user interface to the second device. In some implementations, the first device encodes a video stream of display data of the first device. Display data can represent the graphical user interface of the entire display of the first device or a portion of the display, such as an interface of an application which appears on less than the entire display of the first device.

At a block 425, the first device catalogs interface elements of the graphical user interface. Interface elements correspond to controls and other elements of the graphical user interface. Interface elements may be associated with images or other graphics. The first device catalogs interface elements so that when it receives input from the second device, it may quickly identify if the received input is intended to interact with an interface element.

An interface element can be active, meaning a user can interact with it, or inactive. For example, a background image on a webpage may be an inactive interface element and a link displayed over the background image may be active. Interface elements are associated with a location on the graphical user interface. For example, interface elements can be associated with a two-dimensional location or an area on a display, such as a pixel location or a location relative to other elements or the display size. Interface elements can also be associated with a location of a lateral position of the interface element in a stack of interface elements displayed atop each other in the graphical user interface. Active interface elements are further associated with an action that should take place in response to an interaction with the interface element.

The system may identify and catalog interface elements in different ways. In some implementations, the system parses an interface hierarchy of the graphical user interface of the first device to identify and catalog interface elements. For example, at runtime, user interface elements may be represented by objects stored in memory, and the system can identify the user interface elements by parsing the objects found in memory. In some implementations, the user interface is represented by a series of UIView objects, which draw content on a display and contain subviews, creating a user interface hierarchy from which the system may identify interface elements.

The system catalogs interface elements at various times. In some implementations, the system catalogs interface elements after a refresh event. A refresh event includes each time the first device changes the graphical user interface. For example, a refresh event may include a change in graphical user interface occurring after the first device receives an input from a user via a touchscreen interface of the first device, or after the first device receives an input from a user of a second device. A refresh event also includes when an application that is to be remotely controlled is opened. In some implementations, interface elements are cataloged each time a display is updated.

The system can store cataloged interface elements in different ways. In some implementations, the system stores interface elements in a tree structure. The tree structure is a hierarchical representation of interface elements of a graphical user interface. Each node of the tree includes information about an interface element and references to children interface elements. The tree may be generated from parsing the user interface hierarchy maintained by the first device. In some implementations, only active interface elements that can be controlled or affected by user input are added to the tree structure. In some implementations, a data structure and application programming interface (API) handles all insertions into the tree. When an input is received from the second device, an implicated interface element may be identified by, for example, traversing the tree structure.

In other implementations, rather than catalog interface elements in a tree, the system represents the graphical user interface of the first device as a matrix data structure and stores keys in all matrix locations representing an area associated with an interface element. Subsequently, when input is received from a second device, the system identifies an implicated interface element based on the key stored in the matrix at the location corresponding to the received input and the value associated with that key in a dictionary. For example, the system may store in a dictionary a representation of each pixel that is part of an interface element, such as a UIView object, where a key corresponds to a pixel location and a value corresponds to the UIView object. A button, for example, may cover pixels (0,0) at its top left through (100,100) at its bottom right, and all pixels within that span of pixels are stored with their coordinate as the key and the UIView object corresponding to the button as their value.

In some implementations, the system catalogs interface elements and selectively allows access to only certain of the cataloged interface elements. For example, an interface element may be cataloged and specially flagged to indicate it is not enabled for remote gesture sharing by the system. Only those interface elements that have been cataloged and not flagged otherwise can be controlled or affected by input received from the second device. Interface elements that should not be enabled for remote gesture control may be specified, for example, in the configuration of the first mobile device component. An advantage of cataloging interface elements and only allowing access to certain interface elements is that a user of the second device can still view the entire graphical user interface of the first device, but will be prevented from interacting with those interface elements that they are not authorized to interact with. By doing so, the sharing of the graphical user interface of the first device may be done more securely, by not allowing gesture controls from the second device to interact with highly-sensitive controls on the first device. For example, in a financial embodiment used by a bank, certain controls to enable the transfer of money to third parties might be prevented from access by a user of the second device.

At a block 430, the first device receives input from the second device. In some implementations, the input from the second device is a single touch coordinate. In some implementations, input from the second device is represented by a gesture, which may include a beginning coordinate, an end coordinate, and movement data. Movement data may indicate whether a gesture has begun, whether it has ended, whether it is moving, or whether it was canceled (i.e., interrupted by an external event, such as an incoming phone call), and may for example be encoded in phase data of an iOS UITouch object. The input may include other information related to a gesture depending on the embodiment. For example, in implementations in which sensed motion is identified as a gesture, the motion may be represented by a general location, a direction of the gesture, and a time interval of the gesture. In some implementations, the received input is converted to an appropriate format for receiving input at the first device. For example, if a first device utilizes an Android operating system, user input into a second device that is transmitted to the first device may be converted to input understood by the Android operating system. Alternatively, the second device could convert the input to Android-compatible input prior to transmitting the input.

At a decision block 435, the first device determines whether the received input applies to an interface element. In some implementations, the received input is compared to cataloged data associated with interface elements to determine whether an interface element has been implicated by the input. In some implementations, an API traverses a tree structure in pre-order fashion and identifies an interface element that bounds a coordinate associated with the received input. If the first device determines that the received input does not apply to an interface element, the process proceeds to a decision block 437, where the system determines whether any changes have been made to the graphical user interface displayed on the first device. If no changes have been made, processing continues to block 430 where the next input from the second device is received and interpreted. If changes have been made to the GUI displayed on the first device, however, processing returns to block 425 where the system re-catalogs the first device graphical user interface elements and then re-interprets the input.

If at decision block 435 the first device determines that the received input does apply to an interface element, the process 400 continues to a block 440, and the first device performs an action associated with the received input to the interface element. The mobile device may use platform specific method calls to perform the behavior or function associated with the interface element. For example, in a drawing application, a received input may correspond to a pressing of a pen, and the mobile device may correlate a gesture made by a remote user across a drawing area of an application as an input of a line drawn across a drawing area of an application.

The process then proceeds to a decision block 445, where the first device determines whether to terminate the stream of the graphical user interface to the second device and the second device's ability to control the first device. In some implementations, the first device receives an instruction from the second device to terminate the connection between the first device and the second device. In some implementations, the first device receives an instruction from a local user to terminate the connection between the first device and the second device. In some implementations, the system may generate an instruction to terminate the streaming when, for example, a certain period elapses in which there is no action by either user. If the first device determines that the streaming should continue, the process returns to a block 425 where the first device catalogs interface elements. If the instruction indicates that the streaming should cease, however, then the process 400 terminates.

Figure 5:
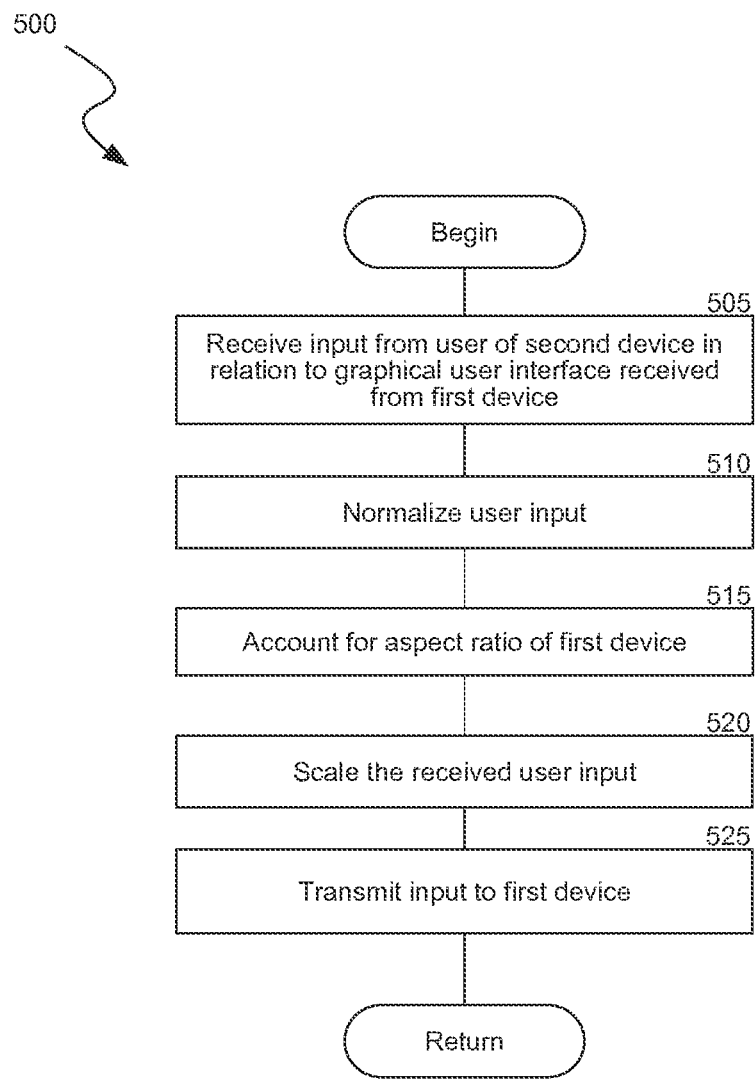
FIG. 5 is a flow diagram depicting a method for processing input at a remote device for control of a host device.

FIG. 5 is a flow diagram representing a process 500 performed by the system 300 for converting input received by the second device into a compatible format for input to the first device. At a block 505, the system receives an input, T, from a user of the second device in relation to a graphical user interface received from the first device, as that graphical user interface is displayed on the second device. Various characteristics of the input T are captured by the system, such as the (x,y) coordinates of the input. The coordinates are typically measured from a reference location of the displayed graphical user interface, such as the upper left corner of the displayed interface. If the second device is a touchscreen device, other characteristics of the input may be measured such as a duration of a touch or a pressure of a touch. The process 500 may occur prior to block 430 in the process 400 described above. The system may capture the input using an application operating on the mobile device.

At a block 510, the system normalizes the user input to the bounds of the graphical user interface based on the area, V, of the graphical user interface as displayed on the second device. The graphical user interface area V is of size $V_x$ and $V_y$ in the x- and y-dimensions, respectively. The system normalizes the (x,y) coordinates of the user input to the x- and y-dimension bounds of the graphical user interface as follows:

$$T'_{x,y} = 2 \cdot \frac{T_{x,y}}{V_{x,y}} - 1$$

At a block 515, the system accounts for an aspect ratio $P_1$ of the graphical user interface displayed on the first device. In some implementations, the system gathers information indicative of the aspect ratio $P_1$ from sequence parameter set (SPS) information of an inbound h.264 stream of the graphical user interface. Let S represent a 2-dimensional transformation matrix, the system accounts for the aspect ratio as follows:

$$\text{If } P_1 > \frac{V_x}{V_y} \text{ then,}$$

$$S = \begin{bmatrix} 1 & 0 \\ 0 & \frac{P_1 \times V_y}{V_x} \end{bmatrix}$$

else, $$S = \begin{bmatrix} \frac{P_1 \times V_x}{V_y} & 0 \\ 0 & 1 \end{bmatrix}$$

At a block 520, the system scales the normalized received user input, T', for transmission to the first device using the calculated transformation matrix S. In some implementations, T" is clamped to [−1 . . . 1] and scaled to the range of [0 . . . 1] for transmission, as follows:

$$T''_{x,y} = \frac{\max(\min(T'_{x,y} \times S, 1), -1)}{2} + \frac{1}{2}$$

At a block 525, the system transmits a normalized and scaled representation of the input T" to the first device. In some implementations, the input T" is transmitted via real-time transfer protocol (RTP) to the first device. The first device multiplies the received representation of the user input T" by a height and width of the corresponding user interface of the first device to interpret the received input as a corresponding input to the first device. For example, let Q represent a touch coordinate on the first device, and let R represent the remote client screen dimensions (assuming the user interface fills the complete screen on the first device), then $$Q = R \times T''.$$

Figure 6:
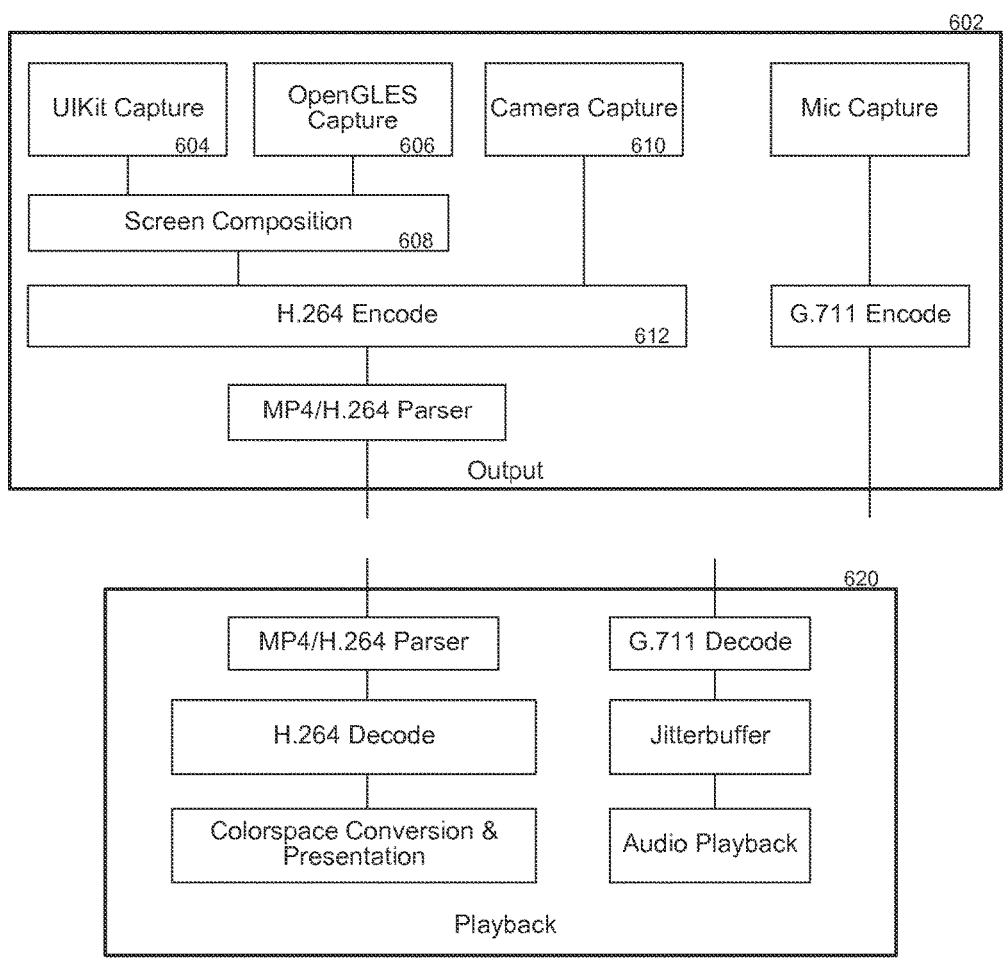
FIG. 6 is a perspective view of a client media layer.

FIG. 6 is a perspective view of a client media layer overview, including an output component 602 and playback component 620. In this diagram, the medial layer overview depicts an output block diagram and a playback block diagram. In the output component block diagram, a User Interface Kit (UIKit) capture module 604 and an OpenGL ES capture module 606 are inputs to a screen composition module 608. OpenGL ES is a cross-platform API for full-function 2D and 3D graphics on embedded systems, including consoles, phones, appliances and vehicles. Depending on the environment, either OpenGL ES 1.X or OpenGL ES 2.X may be implemented by the system. The camera capture module 610, which captures video input from a camera of a device, and screen composition module 608, which captures the output of the composed display of the device, are inputs to the H.264 Encode module 612. H.264 is a next-generation video compression format. Video encoded in H.264 is transmitted from the first device to the second device where it is received by playback component 620. Playback component 620 decodes and displays the received video stream in a fashion known to one skilled in the art. By turning the graphic user interface on the first device into a video stream, the system allows a user of the second device to be able to view actions taken by a user of the first device with respect to the graphic user interface.

In some embodiments, in addition to the transmission of video from the first device to the second device, the output component 602 and playback component 620 also enable the transmission of audio from one device user for another. To enable the transmission of audio, the output component includes a G.711 encoder module and the playback component includes a G.711 decoder module. In this fashion, audio from the first device may also be conveyed to the second device.

Figure 7:
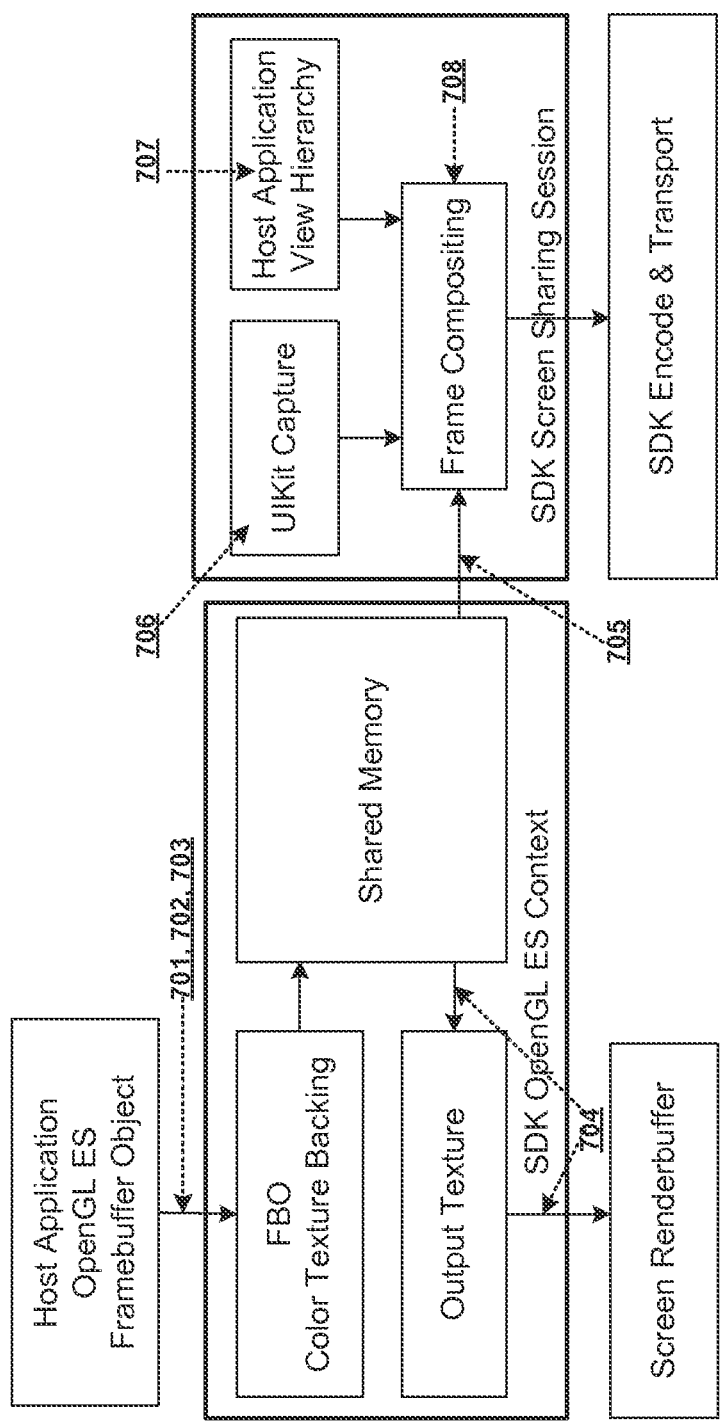
FIG. 7 is a diagram depicting interaction between components of a software development kit (SDK) for conveying a graphical user interface of a host device to a remote device and receiving input from a user of the remote device.

FIG. 7 is a diagram of an implementation of the system as embodied in an SDK, and a description of steps for utilizing the SDK to provide for the display of a user interface on a second device and receive gesture control of the interface by the second device. The SDK may be used by a host application to enable screen sharing and remote gesture control of the host application. At a first step 701, the host application instantiates an OpenGL ES Context provided by the SDK, instead of the default OpenGL ES Context provided natively, such as by the iOS or Android operating systems. Instantiating an SDK OpenGL ES Context enables the screen sharing of OpenGL ES content. At a step 702, the SDK OpenGL ES Context creates a texture backed by shared memory, and attaches it to the default framebuffer object's color attachment. At a step 703, all OpenGL ES content is rendered directly to the SDK's shared memory buffer, without interfering with the host application. At a step 704, the SDK renders this content to the original renderbuffer created by the host application, such that it is displayed on the screen of the device on which the host application is running. At a step 705, frames are submitted to the SDK's screen sharing session, so that they may be composited with UIKit content, such as interface elements provided by iOS, if applicable. At a step 706, UIKit content to be composited is captured, such as with the CALayer renderInContext function in the iOS operating system. At a step 707, the UIKit view hierarchy is parsed to determine where OpenGL ES content should be layered. At a step 708, the UIKit and OpenGL ES content are composited in a background OpenGL ES Context.

Figure 8:
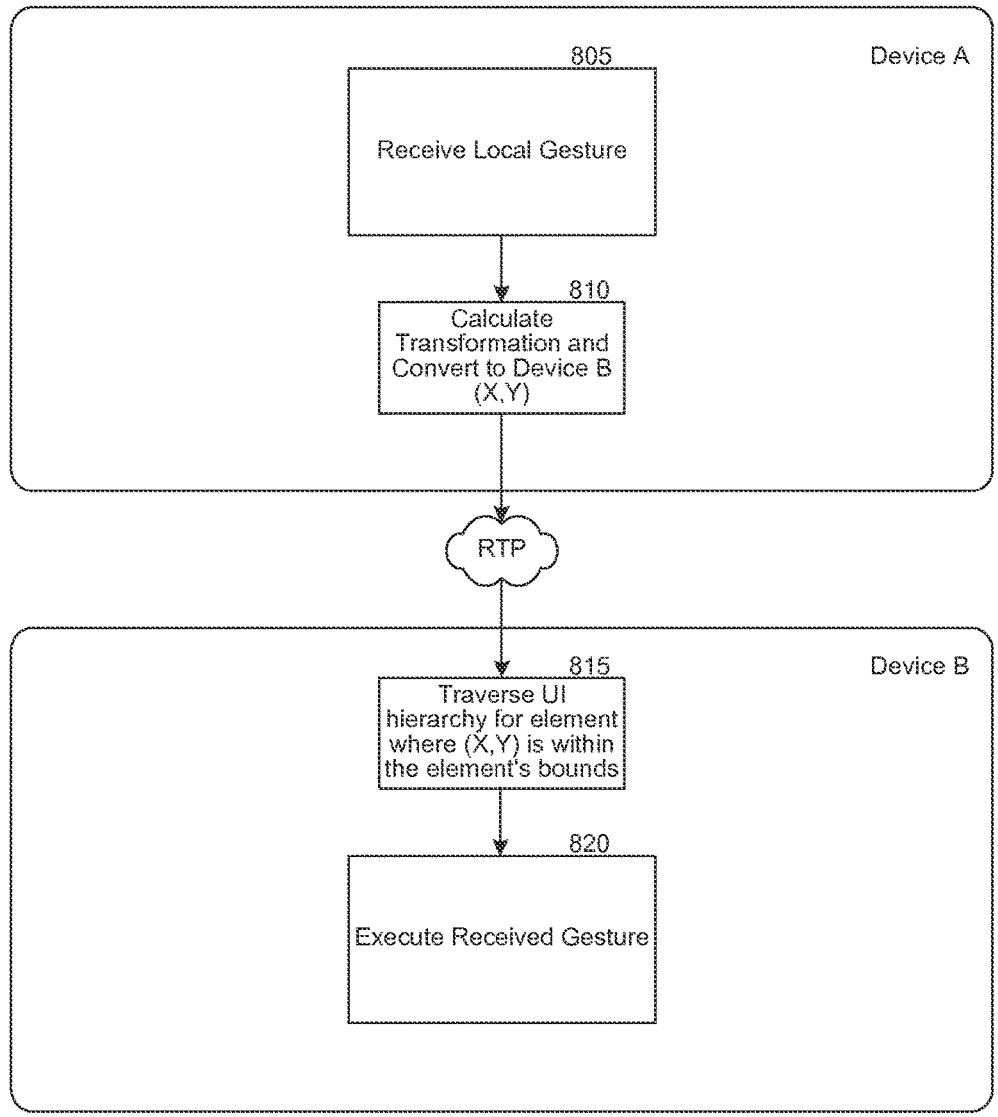
FIG. 8 is diagram of high-level steps involved in gesture control of a first device by a second device.

FIG. 8 shows an overview of steps involved in gesture control of a first device by a second device. At a step 805, Device A receives local gestures from a user of Device A with respect to a graphical user interface of Device B. At a block 810, Device A calculates a gesture transformation based on aspects of Device A and Device B, such as the aspect ratio and dimensions of the graphical user interface on each of the two devices, and converts the local gesture to (x,y) coordinates for Device B. Such transformation is described in additional detail in FIG. 5 herein. In some implementations, rather than Device A computing the gesture transformation, Device A transmits sufficient information about the touch and Device A characteristics to allow Device B to convert the touch using an appropriate transformation. Gesture data is transmitted over an RTP connection between Device A and Device B. At a block 815, Device B traverses a user interface hierarchy for interface elements where the received gesture is within an interface element's bounds. At a block 820, the client application on Device B sharing the graphical user interface executes the gesture as if it were made locally at Device B.

FIG. 9 shows a diagram of a remote device (a smartphone 910) viewing a graphical user interface of a host device (a tablet 905) and providing input to the graphical user interface via the remote device. For example, user input of an element of the GUI received on the smartphone 910 causes a corresponding manipulation of the element on the graphical user interface on the tablet 905.

Figure 10:
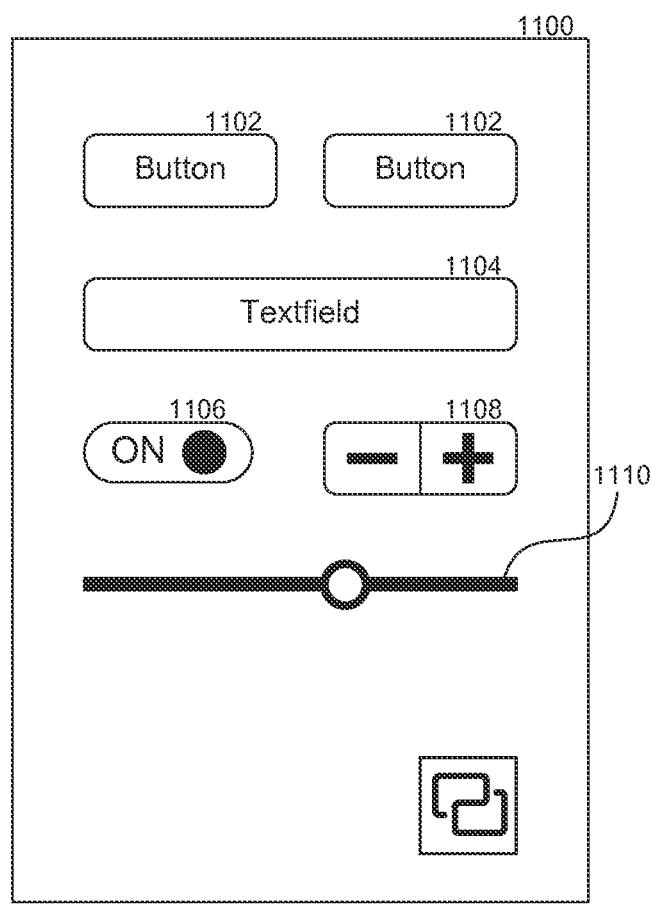
FIG. 10 shows an example graphical user interface including interface elements transmitted between a host device and a remote device.

FIG. 10 shows an example graphical user interface 1100 including interface elements. Interface elements include buttons 1102, a text field 1104, special buttons 1106 and 1108, and a slider 1110. As was described herein, the system catalogs interface elements and may selectively allow access to only certain of the cataloged interface elements. For example, the buttons 1102 in the graphical user interface 1100 may be disabled for remote gesture sharing by the system. When disabled, touches by a user on the displayed buttons 1102 on a second device would not result in a corresponding press of the buttons 1102 on the interface of the first device. The user of the first device would still be able to depress buttons 1102 in order to execute the linked functionality. All other depicted interface elements would be active for remote gesture sharing, however, meaning that the user of the second device could interact with, for example, slider 1106 and text field 1104. In this fashion, the application developer or owner is allowed to selectively decide which functionality is made available for remote gesture sharing.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A method performed by a first computing device, the method comprising:
cataloging interface elements of a graphical user interface displayed on the first computing device, wherein each cataloged interface element is associated with an indication of weather the interface element can be executed by a received gesture representation;
generating, at the first computing device, an encoded video stream of the graphical user interface;
transmitting, from the first computing device, the encoded video stream of the graphical user interface to a second computing device, the encoded video stream causing the display of the graphical user interface on the second computing device;
receiving a representation of a gesture of a user on the second computing device, wherein:
the gesture is with respect to the graphical user interface displayed on the second computing device, and
the representation of the gesture is transformed to reflect a difference between the graphical user interface displayed on the second computing device and the graphical user interface displayed on the first computing device;
comparing the received gesture representation to the cataloged interface elements;
identifying an interface element of the cataloged interface elements that is implicated by the received gesture representation, wherein the identified interface element is associated with a function; and
executing the function associated with the identified interface element on the first computing device when the associated indication for the identified interface element indicated that the interface element can be executed by the received gesture representation.

2. The method of claim 1, wherein some of the interface elements are cataloged in a fashion that indicates they cannot be implicated by the received gesture representation.

3. The method of claim 1, wherein the catalog of interface elements comprises a button, a text field, a special button, or a slider.

4. The method of claim 1, wherein the representation of the gesture is transformed based on dimensions of the graphical user interface displayed on the first computing device and dimensions of the graphical user interface displayed on the second computing device.

5. The method of claim 1, wherein the representation of the gesture is converted to a format that can be understood by an operating system of the first computing device.

6. The method of claim 1, wherein comparing the received gesture representation to the cataloged interface elements comprises comparing a coordinate associated with the received gesture representation to coordinate boundaries associated with each cataloged interface element.

7. The method of claim 1, wherein the first computing device includes a touch-sensitive display, and wherein comparing the received gesture representation to the cataloged interface elements comprises interpreting the transformed gesture as a touch input.

8. The method of claim 1, wherein the transmitted encoded video stream of the graphical user interface includes video of actions taken by a user of the first computing device with respect to the graphical user interface displayed on the first computing device.

9. The method of claim 1, further comprising:
transmitting an encoded video stream of a user of the first computing device to the second computing device, the transmitted encoded video stream captured from a camera of the first computing device; and
receiving an encoded video stream of the user of the second computing device at the first computing device, the encoded video stream of the user of the second computing device being presented to the user of the first computing device.

10. A method performed by a first computing device, the method comprising:
receiving, an encoded video stream of a graphical user interface of a second computing device, the encoded video stream generated by the second computing device;
displaying the received encoded video stream of the graphical user interface on the first computing device;
receiving an input gesture from a user of the first computing device, wherein the input gesture is with respect to the graphical user interface displayed on the first computing device;
transmitting a representation of the input gesture to the second computing device, wherein:
the representation of the gesture is transformed to reflect a difference between the graphical user interface displayed on the first computing device and the graphical user interface displayed on the second computing device,
the transformation is based on dimensions of the graphical user interface displayed on the first computing device and dimensions of the graphical user interface displayed on the second computing device, and
the transmitted representation of the input gesture is compared against interface elements of the graphical user interface on the second computing device to identify an interface element implicated by the input gesture, wherein each interface element of the graphical user interface on the second device is associated with an indication of whether the interface element can be implicated by a transmitted gesture representation, and wherein identifying the implicated interface element is based in part on the indication associated with the interface element.

11. The method of claim 10, wherein the interface elements of the graphical user interface on the second device comprises a button, a text field, a special button, or a slider.

12. The method of claim 10, wherein the representation of the gesture is converted to a format that can be understood by an operating system of the second computing device.

13. The method of claim 10, wherein comparing the transmitted gesture representation to the interface elements of the graphical user interface on the second computing device comprises comparing a coordinate associated with the transmitted gesture representation to coordinate boundaries associated with each interface element.

14. The method of claim 10, wherein the second computing device has a touch-sensitive display, and wherein comparing the transmitted gesture representation to the interface elements of the graphical user interface on the second computing device comprises interpreting the transformed gesture as a touch input.

15. The method of claim 10, further comprising:
receiving an encoded video stream of a user of the second computing device, the received encoded video stream captured from a camera of the second computing device; and
transmitting an encoded video stream of the user of the first computing device to the second computing device, the encoded video stream of the user of the first computing device being presented to the user of the second computing device.

16. A system including at least one processor and memory for sharing a user interface and receiving remote inputs directed to the user interface, the system comprising:
an interface characterizing component configured to create a representation of interfacing elements of a graphical user interface displayed on a first device, wherein the representation of interfacing elements includes an indication of whether each interface element is to be made accessible to a remote user;
a communication component configured to:
transmit an encoded video stream of the graphical user interface to a second computing device, the encoded video stream generated by the first computing device and causing the display of the graphical user interface on the second computing device; and
receive a representation of a gesture of a user on the second computing device, wherein the gesture is with respect to the graphical user interface displayed on the second computing device, and wherein the representation of the gesture is transformed to reflect a difference between the graphical user interface displayed on the second computing device and the graphical user interface displayed on the first computing device; and
a gesture processing component configured to:
compare the received gesture representation to the created representations of interfacing elements;
identify an interface element of the representation of interfacing elements that is implicated by the received gesture representation, wherein the identified interface element is associated with a function; and
execute the function associated with the identified interface element on the first computing device contingent on the interface element being accessible to the remote user based on the indication of whether the interface element is to be made accessible.

17. The system of claim 16, wherein comparing the transmitted gesture representation to the representation of interfacing elements comprises comparing a coordinate associated with the transmitted gesture representation to coordinate boundaries associated with each interface element.

* * * * *